US012592341B2

(12) United States Patent
Yoo et al.

(10) Patent No.: US 12,592,341 B2
(45) Date of Patent: Mar. 31, 2026

(54) DIELECTRIC GRAINS OF MULTILAYERED CAPACITOR

(71) Applicant: SAMSUNG ELECTRO-MECHANICS CO., LTD., Suwon-si (KR)

(72) Inventors: Yongju Yoo, Suwon-si (KR); Myungwoo Lee, Suwon-si (KR); Haesol Jung, Suwon-si (KR); Jinseong Kim, Suwon-si (KR); Jaemin Han, Suwon-si (KR); Seungjun Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 103 days.

(21) Appl. No.: 18/605,026

(22) Filed: Mar. 14, 2024

(65) Prior Publication Data

US 2025/0166905 A1 May 22, 2025

(30) Foreign Application Priority Data

Nov. 21, 2023 (KR) ........................ 10-2023-0161947

(51) Int. Cl.
*H01G 4/12* (2006.01)
*H01G 4/30* (2006.01)
(52) U.S. Cl.
CPC ............. *H01G 4/1209* (2013.01); *H01G 4/30* (2013.01)

(58) Field of Classification Search
CPC ............................... H01G 4/1209; H01G 4/30
See application file for complete search history.

(56) References Cited

U.S. PATENT DOCUMENTS 9,666,372 B2 * 5/2017 Kaneko ............... C04B 35/4682
2008/0004172 A1 * 1/2008 Kojima ............. C04B 35/62685
501/134
(Continued)

FOREIGN PATENT DOCUMENTS

CN 107836029 B * 8/2019 ........... C04B 35/638
CN 113161146 A * 7/2021 ....... C04B 35/62894
(Continued)

OTHER PUBLICATIONS

Jung-Kun Lee et al., "Roles of Ba/Ti Ratios in the Dielectric Properties of BaTiO3 Ceramics," J. Am. Ceram. Soc., vol. 84, Issue 9, Sep. 2001, pp. 2001-2006.
(Continued)

*Primary Examiner* — Timothy J. Dole
(74) *Attorney, Agent, or Firm* — Morgan, Lewis & Bockius LLP

(57) ABSTRACT
Provided is a multilayered capacitor, including a capacitor body including a dielectric layer and an internal electrode, and an external electrode disposed outside the capacitor body, wherein the dielectric layer includes a plurality of dielectric grains containing barium titanate as a primary component, at least one of the plurality of dielectric grains has a core-shell structure, the average mole ratio of barium to titanium (Ba/Ti mole ratio) in the core of the dielectric grain is 0.9975 to 1.0055, and the average number of cores per unit area (1 μm×1 μm) in the dielectric layer is 25 to 35.

20 Claims, 8 Drawing Sheets

(56)        References Cited

U.S. PATENT DOCUMENTS

| | | | |
|---|---|---|---|
| 2009/0086407 A1* | 4/2009 | Takahashi | C04B 35/638 |
| | | | 361/321.5 |
| 2011/0222205 A1 | 9/2011 | Muraki et al. | |
| 2018/0182557 A1* | 6/2018 | Park | C01G 23/006 |
| 2018/0211780 A1* | 7/2018 | Hirose | H01G 4/1227 |
| 2021/0304966 A1 | 9/2021 | Murakami et al. | |
| 2021/0350982 A1* | 11/2021 | Saito | C04B 35/6262 |
| 2021/0383973 A1 | 12/2021 | Matsumoto et al. | |
| 2023/0020287 A1* | 1/2023 | Yamaguchi | H01G 4/30 |

FOREIGN PATENT DOCUMENTS

| | | | | |
|---|---|---|---|---|
| JP | 2021-155257 A | 10/2021 | | |
| JP | 7128442 B2 * | 8/2022 | | C04B 35/465 |
| KR | 10-2011-0102827 A | 9/2011 | | |
| KR | 10-2021-0151689 A | 12/2021 | | |

OTHER PUBLICATIONS

Beauger, A. et al., "Role and behaviour of orthotitanate Ba2TiO4 during the processing of BaTiO3 based ferroelectric ceramics," Journal of Materials Science, vol. 19, Jan. 1984, pp. 195-201.

* cited by examiner

DIELECTRIC GRAINS OF MULTILAYERED CAPACITOR

CROSS-REFERENCE TO RELATED APPLICATION

This application claims priority to and the benefit of Korean Patent Application No. 10-2023-0161947 filed in the Korean Intellectual Property Office on Nov. 21, 2023, the entire contents of which are incorporated herein by reference.

BACKGROUND

The present disclosure relates to a multilayered capacitor.

Recently, as electronic devices have rapidly become multifunctional and miniaturized, miniaturization and performance improvement of electronic components are also progressing at a rapid pace. In addition, the demand for high reliability of electrical devices used in automobiles or network equipment, and electronic components for industrial use is also increasing significantly.

In order to meet these market demands, competition in technological development for passive components such as inductors, capacitors, or resistors is accelerating. Particularly, great efforts are required to preempt the market by developing various products of multilayered ceramic capacitor (MLCC), whose uses and usage as passive components are continuously increasing.

In addition, a multilayered capacitor is a capacitor manufactured by stacking dielectric layers and internal electrodes, and is used in various electronic devices such as mobile phones, laptops, and LCD TVs. Particularly, as automotive electronic control technology develops, demand for automobiles is increasing, and as the miniaturization and high functionality of electronic devices for vehicles progress, the high temperature and humidity resistance characteristics of multilayered capacitors are being required.

$BaTiO_3$ (barium titanate), one of the main materials of multilayered capacitors, is a piezoelectric and photoelectric material and has recently been mainly used in multilayered capacitors. However, there are a limited number of companies supplying barium titanate powder worldwide, and their manufacturing technology is also limited.

SUMMARY

The present disclosure provides a multilayered capacitor with an improved dielectric constant by controlling the average mole ratio of the primary component in the dielectric grain core and the average area ratio of the dielectric grain shell.

A multilayered capacitor according to some embodiments may include: a capacitor body including a dielectric layer and an internal electrode; and an external electrode disposed outside the capacitor body, wherein the dielectric layer may include a plurality of dielectric grains containing barium titanate as a primary component, at least one of the plurality of dielectric grains may have a core-shell structure, the average mole ratio of barium to titanium (Ba/Ti mole ratio) in the core of the dielectric grain may be 0.9975 to 1.0055, and the average number of cores per unit area (1 μm×1 μm) in the dielectric layer may be 25 to 35.

The average mole ratio of barium to titanium (Ba/Ti mole ratio) in the core of the dielectric grain may be 0.9980 to 1.0050.

The ratio of the average area of the shell included in one dielectric grain having the core-shell structure to the average area of one dielectric grain having the core-shell structure may be 30% to 50%.

The ratio of the average area of the shell included in one dielectric grain having a core-shell structure to the average area of one dielectric grain having the core-shell structure may be 38% to 46%.

The primary component may include at least one selected from the group consisting of $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, and combinations thereof.

The dielectric grain may further include a secondary component.

The accessory ingredient may include at least one selected from the group consisting of dysprosium (Dy), manganese (Mn), vanadium (V), silicon (Si), aluminum (Al), and combinations thereof.

The secondary component may further include at least one selected from the group consisting of magnesium (Mg), tin (Sn), antimony (Sb), germanium (Ge), gallium (Ga), indium (In), lanthanum (La), chromium (Cr), hafnium (Hf), Yttrium (Y), actinium (Ac), cerium (Ce), praseodymium (Pr), neodymium (Nd), promethium (Pm), samarium (Sm), europium (Eu), gadolinium (Gd), terbium (Tb), holmium (Ho), erbium (Er), thulium (Tm), ytterbium (Yb), lutetium (Lu), and combinations thereof.

The dielectric grain may include 0.5 to 1.5 parts by mole of $Dy_2O_3$, 0.05 to 0.15 parts by mole of $MnO_2$, 0.05 to 0.15 parts by mole of $V_2O_5$, 1.0 to 2.5 parts by mole of $BaCO_3$, 0.5 to 1.0 parts by mole of $SiO_2$, or 0.2 to 1.0 parts by mole of $Al_2O_3$ as the secondary components, with respect to 100 parts by mole of the primary component.

The shell may include the secondary component in excess of 0.1 moles to 30.0 moles or less with respect to 100 moles of the primary component, and the core may include 0.1 moles or less of the secondary component with respect to 100 moles of the primary component.

The core may have an average diameter of 50 nm to 500 nm.

The dielectric layer may have an average thickness of 0.15 μm to 10 μm.

A multilayered capacitor according to another embodiment may include a capacitor body including a dielectric layer and an internal electrode, and an external electrode disposed outside the capacitor body, wherein the dielectric layer includes a plurality of dielectric grains containing barium titanate as a primary component, at least one of the plurality of dielectric grains has a core-shell structure, the average mole ratio of barium to titanium (Ba/Ti mole ratio) in the core of the dielectric grain may be 0.9975 to 1.0055, the average number of cores per unit area (1 μm×1 μm) in the dielectric layer may be 27 to 35, and the ratio of the average area of the shell included in one dielectric grain having a core-shell structure to the average area of one dielectric grain having the core-shell structure may be 30% to 50%.

The average mole ratio of barium to titanium (Ba/Ti mole ratio) in the core of the dielectric grain may be 0.9980 to 1.0050.

The ratio of the average area of the shell included in one dielectric grain having a core-shell structure to the average area of one dielectric grain having the core-shell structure may be 38% to 46%.

The primary components may include at least one selected from the group consisting of $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, and combinations thereof.

The dielectric grain may further include a secondary component, the secondary component may include at least one selected from the group consisting of dysprosium (Dy), manganese (Mn), vanadium (V), silicon (Si), aluminum (Al), and combinations thereof.

The dielectric grain may include 0.5 to 1.5 parts by mole of $Dy_2O_3$, 0.05 to 0.15 parts by mole of $MnO_2$, 0.05 to 0.15 parts by mole of $V_2O_5$, 1.0 to 2.5 parts by mole of $BaCO_3$, 0.5 to 1.0 parts by mole of $SiO_2$, or 0.2 to 1.0 parts by mole of $Al_2O_3$ as the secondary components with respect to 100 parts by mole of the primary component.

The shell may include the secondary component in excess of 0.1 moles to 30.0 moles or less with respect to 100 moles of the primary component, and the core may include 0.1 moles or less of the entire secondary component with respect to 100 moles of the primary component.

The core may have an average diameter of 50 nm to 500 nm.

The dielectric layer may have an average thickness of 0.15 μm to 10 μm.

According to the multilayered capacitor according to some embodiments, it is possible to provide a multilayered capacitor with a very excellent dielectric constant by controlling the average mole ratio of the primary component in the dielectric grain core and the average area ratio of the dielectric grain shell.

DETAILED DESCRIPTION OF THE EMBODIMENTS

Figure 1:
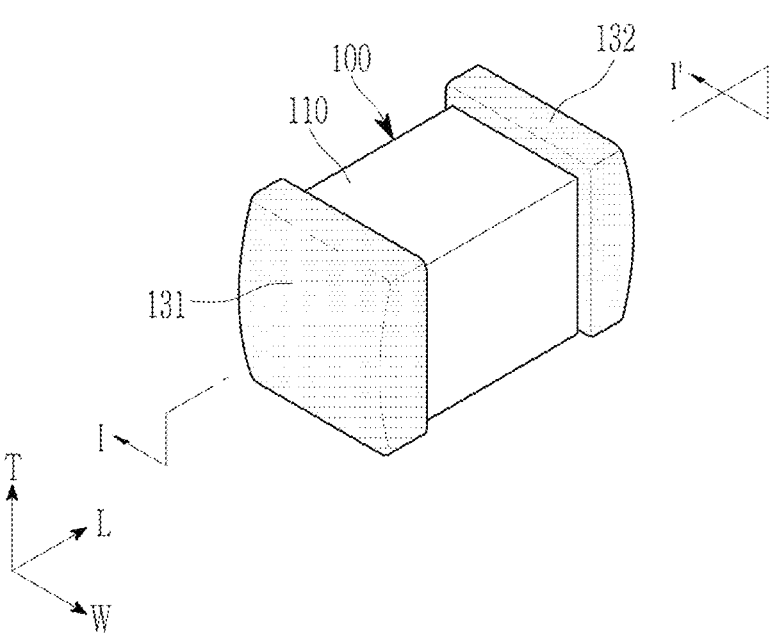
FIG. 1 is a perspective view showing a multilayered capacitor according to an embodiment.

Hereinafter, the present disclosure will be described in detail hereinafter with reference to the accompanying drawings, in which embodiments of the present disclosure are shown. The drawings and description are to be regarded as illustrative in nature and not restrictive. Like reference numerals designate like elements throughout the specification. The accompanying drawings are intended only to facilitate an understanding of the embodiments disclosed in this specification, and it is to be understood that the technical ideas disclosed herein are not limited by the accompanying drawings and include all modifications, equivalents, or substitutions that are within the range of the ideas and technology of the present disclosure.

Although terms first," "second," and the like are used to explain various constituent elements, the constituent elements are not limited to such terms. These terms are only used to distinguish one constituent element from another constituent element.

When it is mentioned that a certain component is "coupled with" or "connected with" another component, it may be understood that another component can exist between the two components although the component can be directly coupled or connected with another component. Meanwhile, when it is mentioned that a certain component is "directly coupled with" or "directly connected with" another component, it has to be understood that another component does not exist between the two components.

Throughout the specification, the terms "comprise" or "have" are intended to specify the presence of stated features, integers, steps, operations, constituent elements, components, or a combination thereof, but do not preclude the presence or addition of one or more other features, integers, steps, operations, constituent elements, components, and/or groups thereof. Therefore, unless explicitly described to the contrary, the term "comprise" and variations such as "comprises" or "comprising" will be understood to imply the inclusion of stated elements but not the exclusion of any other elements.

Figure 2:
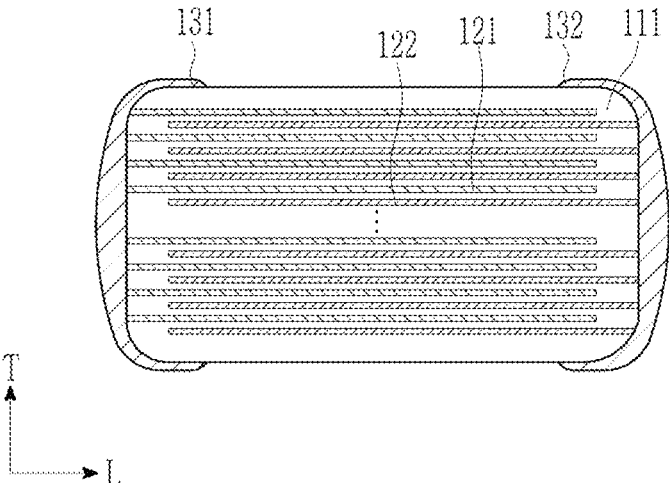
FIG. 2 is a cross-sectional view of the multilayered capacitor taken along line I-I' of FIG. 1.
Figure 3:
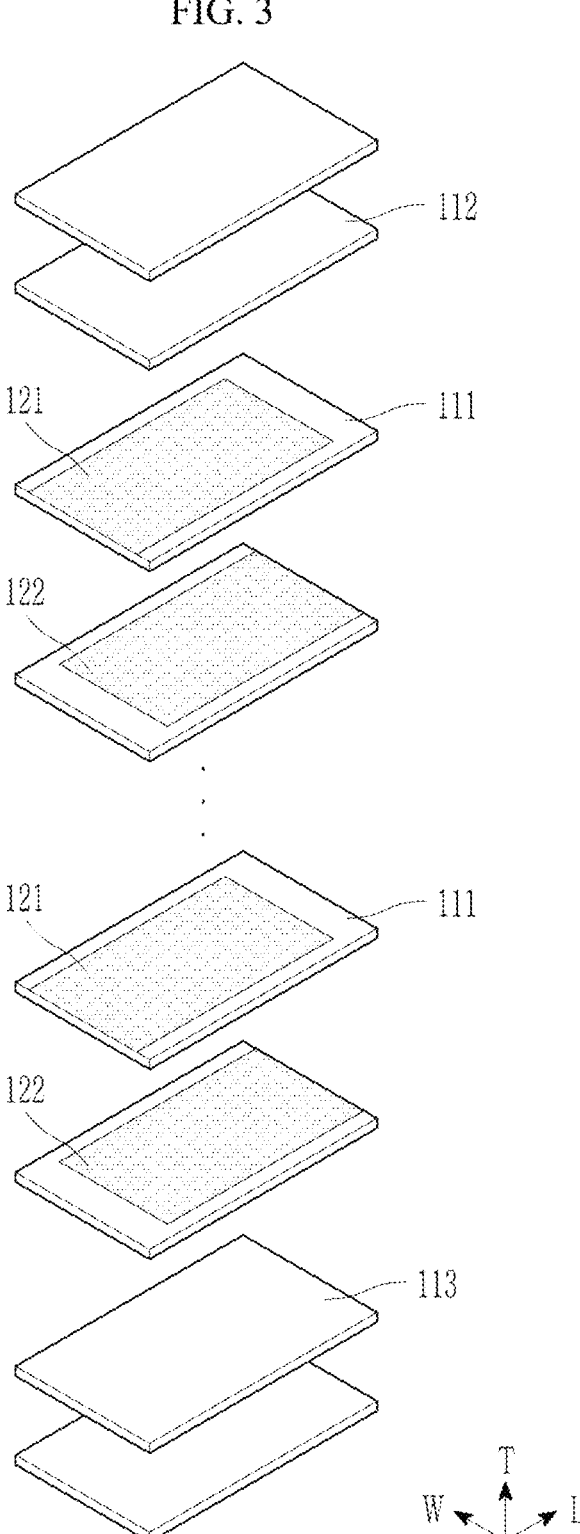
FIG. 3 is an exploded perspective view showing the stacking structure of internal electrode layers in the capacitor body of FIG. 1.

FIG. 1 is a perspective view showing a multilayered capacitor 100 according to an embodiment, FIG. 2 is a cross-sectional view of the multilayered capacitor 100 taken along line I-I' of FIG. 1, and FIG. 3 is an exploded perspective view showing the stacking structure of internal electrode layers in a capacitor body 110 of FIG. 1.

When defining directions to clearly explain the present embodiment, the L-axis, W-axis, and T-axis shown in the drawing represent the length direction, width direction, and thickness direction of the capacitor body 110, respectively. Here, the thickness direction (T-axis direction) may be a direction perpendicular to the wide surface (main surface) of the sheet-shaped components, and may be used as the same concept as a stacking direction in which a dielectric layer 111 is stacked, for example. The longitudinal direction (L-axis direction) may be a direction extending parallel to the wide surface (main surface) of the sheet-shaped components, and may be approximately perpendicular to the thickness direction (T-axis direction). For example, the longitudinal direction (L-axis direction) may be the direction in which an external electrode 131 and a second external electrode 132 are located. The width direction (W-axis direction) may be a direction extending parallel to the wide surface (main surface) of the sheet-shaped components, and may be approximately perpendicular to the thickness direction (T-axis direction) and the longitudinal direction (L-axis direction). The length of the sheet-shaped components in the longitudinal direction (L-axis direction) may be longer than the length in the width direction (W-axis direction).

Referring to FIGS. 1 to 3, a multilayered ceramic capacitor 100 according to an embodiment of the present disclosure may include the capacitor body 110, and a first external electrode 131 and a second external electrode 132 disposed at both ends opposing in the longitudinal direction (L-axis direction) of the capacitor body 110.

For example, the capacitor body 110 may have a roughly hexahedral shape.

For convenience of description of the present embodiment, the two surfaces opposing each other in the thickness direction (T-axis direction) of the capacitor body 110 are referred to as first and second surfaces, the two surfaces connected to the first and second surfaces and opposing each other in the longitudinal direction (L-axis direction) are referred to as third and fourth surfaces, and two surfaces connected to the first and second surfaces and to the third and fourth surfaces, and opposing each other in the width direction (W-axis direction), are referred to as fifth and sixth surfaces.

For example, the first surface, which is the lower surface, may be a surface facing the mounting direction. Additionally, the first to sixth surfaces may be flat, but the embodiment is not limited thereto. For example, the first to sixth surfaces may be curved surfaces with a convex central portion, and the edges, which are the boundaries of each surface, may be rounded.

The shape and size of the capacitor body 110 and the number of stacks of the dielectric layers 111 are not limited to those shown in the drawings of the embodiment.

The capacitor body 110 is a plurality of dielectric layers 111 stacked in the thickness direction (T-axis direction) and then fired, and includes a first inner electrode 121 and a second inner electrode 122 alternately arranged in the thickness direction (T-axis direction) with the plurality of dielectric layers 111 interposed therebetween.

At this time, the boundaries between adjacent dielectric layers 111 of the capacitor body 110 may be integrated to the extent that it is difficult to check without using a scanning electron microscope (SEM).

Additionally, the capacitor body 110 may include an active region and cover regions 112 and 113.

The active region is a portion that contributes to forming the capacitance of the multilayered capacitor 100. For example, the active region may be a region where the first inner electrode 121 or the second inner electrode 122 stacked along the thickness direction (T-axis direction) overlap.

The cover region 112 and 113 are thickness direction margin portions, and may be located on the first and second surfaces of the active region in the thickness direction (T-axis direction), respectively. These cover regions 112 and 113 may be a single dielectric layer 111 or two or more dielectric layers 111 stacked on the upper and lower surfaces of the active region, respectively.

Additionally, the capacitor body 110 may further include a side cover region. The side cover region is a width direction margin portion, and may be located on the fifth and sixth surfaces of the active portion in the width direction (W-axis direction), respectively. The side cover region may be formed by applying a conductive paste layer for the inner electrode layer on the surface of the dielectric green sheet, applying the conductive paste layer on only a part of the surface of the dielectric green sheet, and not applying the conductive paste layer on both sides of the surface of the dielectric green sheet, and then stacking the dielectric green sheets.

The cover regions 112 and 113 and the side cover region serve to prevent damage to the first inner electrode 121 and the second inner electrode 122 due to physical or chemical stress.

Figure 4:
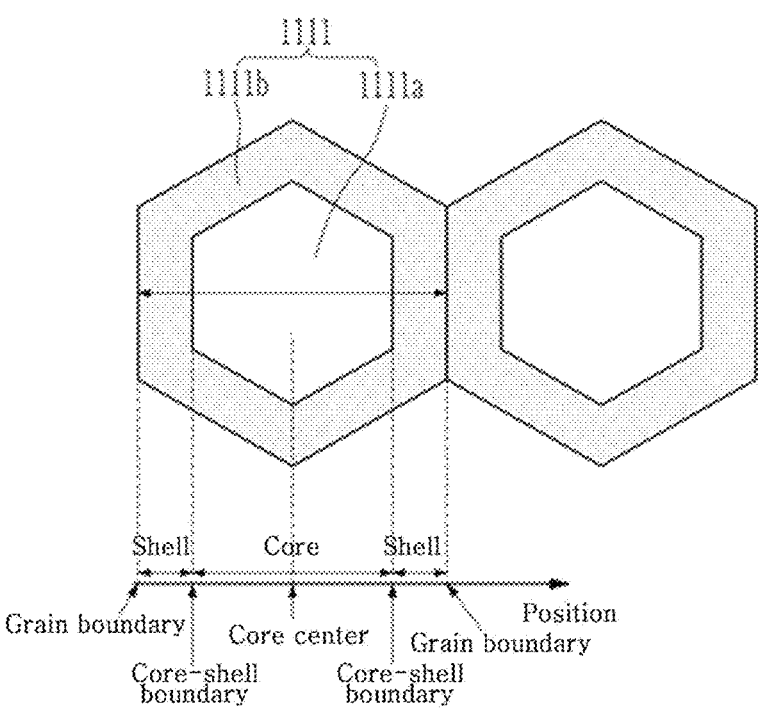
FIG. 4 is a diagram schematically showing the composition of a dielectric grain in the dielectric layer.

FIG. 4 is a diagram schematically showing the composition of a dielectric grain 1111 in the dielectric layer. Hereinafter, with reference to FIG. 4, the dielectric layer 111 will be described in detail.

The dielectric layer 111 includes a plurality of dielectric crystal grains 1111.

The dielectric crystal grains 1111 include barium titanate as a primary component. The primary component is a dielectric base material, which has a high dielectric constant, and contributes to forming the dielectric constant of the multilayered capacitor 100.

For example, the primary component may be a dielectric material containing at least one selected from the group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), $(Ba_{1-x}Ca_x)_m(Ti_{1-y}Sn_y)O_3$ ($0.995 \leq m \leq 1.010$, $0 \leq x \leq 0.10$, $0 < y \leq 0.20$), and combinations thereof.

For example, the primary component may include at least one selected from the group consisting of $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, and combinations thereof.

The dielectric grain may further include a secondary component along with the primary component.

The secondary component may include at least one selected from the group consisting of dysprosium (Dy), manganese (Mn), vanadium (V), silicon (Si), aluminum (Al), barium (Ba), and combinations thereof.

Additionally, the secondary component may further include at least one selected from the group consisting of magnesium (Mg), tin (Sn), antimony (Sb), germanium (Ge), gallium (Ga), indium (In), lanthanum (La), chromium (Cr), and hafnium (Hf), yttrium (Y), actinium (Ac), cerium (Ce), praseodymium (Pr), neodymium (Nd), promethium (Pm), samarium (Sm), europium (Eu), gadolinium (Gd), terbium (Tb), holmium (Ho), erbium (Er), thulium (Tm), ytterbium (Yb), lutetium (Lu), and combinations thereof.

For example, the dielectric grain may include 0.5 to 1.5 parts by mole of $Dy_2O_3$, 0.05 to 0.15 parts by mole of $MnO_2$, 0.05 to 0.15 parts by mole of $V_2O_5$, 1.0 to 2.5 parts by mole of $BaCO_3$, 0.5 to 1.0 parts by mole of $SiO_2$, or 0.2 to 1.0 parts by mole of $Al_2O_3$ as the secondary component with respect to 100 parts by mole of the primary component. In this case, it may be easy to make relative comparisons for dielectric changes.

In the dielectric grain 1111, there may be a portion in which the mole ratio of the secondary component to the primary component is different. For example, at least one of the plurality of dielectric grains 1111 has a core-shell structure including a core and a shell. The dielectric grain 1111 having a core-shell structure includes a dielectric core 1111a and a shell 1111b surrounding at least a portion of the core 1111a in one dielectric grain 1111.

The core 1111a and the shell 1111b have different mole ratios of the secondary component to the primary component. For example, the mole ratio of the secondary component to the primary component may change rapidly at the boundary between the core 1111a and the shell 1111b. Accordingly, the boundary between the core 1111a and the shell 1111b may be easily distinguished, and this can be seen through transmission electron microscopy-energy dispersive X-ray analysis (TEM-EDX).

For example, in a cross-section cut from the center of the W-axis direction of the capacitor body 110 in the L-axis and T-axis directions, when line analysis is performed using an energy disperse X-ray spectrometer (EDS) installed in a transmission electron microscope (TEM) on the dielectric grain 1111 located in the center of the active area, from the center of the core 1111a of the dielectric grain 1111, in the direction of the grain boundary on either side of the dielectric grain 1111, the core 1111a and the shell 1111b may be distinguished by using a portion where the total content of the secondary component may start to increase rapidly as a boundary between the core 1111a and the shell 1111b.

Here, the center of the core 1111a may be determined as the point where the longest major axis of the core 1111a and the shortest minor axis orthogonal thereto meet. In addition, energy dispersive X-ray spectrometer (EDS) line analysis may be conducted along the longest major axis passing through the center of the core 1111a of the dielectric crystal 1111. Alternatively, the boundary between the core 1111a and the shell or the boundary between the shell and the grain boundary may be defined by distinguishing portions with differences in contrast, such as by binarizing the transmission electron microscope image.

For example, the core 1111a may contain 0.1 parts by mole or less of the secondary component with respect to 100 parts by mole of the primary component, and the shell 1111b may contain the secondary component in excess of 0.1 parts by mole to 30.0 parts by mole or less, or in excess of 0.1 moles to 20.0 moles or less with respect to 100 parts by mole of the primary component.

If the core 1111a contains the secondary component in excess of 0.1 parts by mole with respect to 100 parts by mole of the primary component, the material properties of the pure dielectric material (e.g., $BaTiO_3$) may change. If the shell 1111b contains 0.1 parts by mole or less of the secondary component with respect to 100 parts by mole of the primary component, the range of change in dielectric constant depending on temperature may increase. If the shell 1111b contains the secondary component in excess of 30.0 parts by mole with respect to 100 parts by mole of the primary component, the initial insulation resistance may be decreased.

That is, the secondary component may not exist in the core 1111a, or if present, only a trace amount may be present. Therefore, the core 1111a may be composed of only the pure primary component without containing impurities, and the pure primary component may generally have a higher dielectric constant than the primary component doped with an impurity element. Accordingly, the core 1111a may perform a role of maintaining the dielectric constant.

The shell 1111b contains more secondary components than the core 1111a. In the shell 1111b, the secondary component doped at the B-site of the primary component (perovskite $ABO_3$ structure) has the effect of increasing the band gap energy through which other rare earth and doping elements diffuse into the dielectric grain 1111. Accordingly, the secondary component doped at the B-site of the primary component (perovskite $ABO_3$ structure) may serve as a barrier to prevent other rare earths and doping elements from diffusing into the dielectric grain 1111.

The shell 1111b may play a role in suppressing the growth of the dielectric grain 1111 and contribute to the atomization of the dielectric grain 1111. Additionally, the secondary component doped at the A-site of the primary component in the shell 1111b may play a role in improving reliability and dielectric constant.

The dielectric grains 1111 have an average mole ratio of barium to titanium (Ba/Ti mole ratio) of 0.9975 to 1.0055 in the core 1111a of the dielectric grains. For example, the average mole ratio of barium to titanium (Ba/Ti mole ratio) in the core 1111a of the dielectric grain may be 0.9980 to 1.0050. If the average mole ratio of barium to titanium (Ba/Ti mole ratio) in the core 1111a of the dielectric grain is less than 0.9975 or more than 1.0055, the dielectric constant of the capacitor may decrease.

The component of specific elements (e.g., Ba and Ti) in the core 1111a of the dielectric grain may be measured using nano-XRF, for example, nano-synchrotron X-ray fluorescence (nano-SXRF). At this time, the measurement equipment may be used as the ID16A-NI (UPBL04) product from ESRF (European Synchrotron Radiation Facility).

For example, after the multilayered capacitor 100 is placed in an epoxy mixture and cured, the sides of the capacitor body 110 in the L-axis direction and the T-axis direction are polished up to half the point in the W-axis direction, fixed, and held in a vacuum atmosphere chamber, so that a cross-sectional sample cut in the L-axis direction and the T-axis direction from the center of the W-axis direction of the capacitor body 110 is prepared.

By irradiating the cross-sectional sample of the prepared capacitor body 110 with synchrotron X-ray (10 keV or higher), the content of a specific element (e.g., Ba and Ti) in the core 1111a of the dielectric grain may be measured three times to obtain an average value, and the average value of the minimum and maximum values measured in at least 10 different dielectric grains located in the same dielectric layer may be taken as the final content of the specific element.

For example, when selecting at least 10 different dielectric grains located in the same dielectric layer, they may be selected from a scanning electron microscope (SEM) image obtained by observing the dielectric grains of the dielectric layer 111 located in the center of the active region with the SEM.

The average area ratio of the shell 1111b included by one dielectric grain 1111 having a core-shell structure compared to the average area of one dielectric grain 1111 having a core-shell structure may be 30% to 50%, for example, 35% to 50%, 35% to 46%, or 38% to 46%. If the average area ratio of the shell 1111b included in one dielectric grain 1111 is less than 30% or more than 50%, the dielectric constant of the capacitor may decrease.

The average area ratio of the shell 1111b included in one dielectric crystal grain 1111 having the core-shell structure may be measured by the following method.

The L-axis direction and the T-axis direction surfaces (the fifth or sixth surface) of the capacitor body 110 are polished in the W-axis direction until the dielectric layer 111 is exposed, for example, to about half of the point, the cross-sections in the L-axis direction and the T-axis direction are exposed, a random dielectric layer 111 is selected from the cross-sections in the L-axis direction and the T-axis direction, and the region of 1 μm×1 μm size (unit area) in the active region is taken as the measurement target.

Alternatively, the L-axis direction and W-axis direction surfaces (the first or second surface) of the capacitor body 110 may be polished in the T-axis direction until the dielectric layer 111 is exposed, for example, to about half of the point, the dielectric layer 111 may be exposed on the cross-sections in the L-axis direction and the W-axis direction, and the region of 1 μm×1 μm size (unit area) in the active region may be taken as the measurement target. However, the unit area is set to a region containing at least one dielectric grain having a core-shell structure.

For the measurement target, using the TEM, under conditions of an accelerating voltage of 200 kV and WD of 115 mm, the diameter and area of one dielectric crystal grain 1111 are measured. At this time, the diameter of one dielectric grain 1111 may be calculated as the average value of the longest major axis and the shortest minor axis among the minor axis orthogonal thereto, and the area of one dielectric grain 1111 may be calculated using the diameter assuming the dielectric grain 1111 as a circle.

Further, for the measurement target, the diameter of the core 1111a, the area of the core 1111a, and the area of the shell 1111b are measured by distinguishing the core 1111a and the shell 1111b by measuring the composition and elemental distribution of one dielectric grain 1111, under conditions of an accelerating voltage of 200 kV, WD of 115 mm, and a Mapping scan (Dwell time) 30 us, using an energy disperse X-ray spectrometer (EDS) installed on a transmission electron microscope (TEM).

At this time, the diameter of the core 1111a may be calculated as the average value of the major axis and the minor axis orthogonal thereto, and the area of the core 1111a may be calculated using the diameter assuming the core 1111a as a circle. Additionally, the area of the shell 1111b may be calculated by subtracting the area of the core 1111a from the area of the dielectric grain 1111.

In addition, the average values of the measured diameter of the dielectric grain 1111, the diameter of the core 1111a, the area of the dielectric grain 1111, the area of the core 1111a, and the area of the shell 1111b may be either the arithmetic mean value of three values of the dielectric grain 1111 measured in the three different layers of the dielectric layer 111 in the L-axis direction and T-axis direction cross-sections, or the arithmetic mean value of nine values of the dielectric grains 1111 measured at the center, one end, and the other end of the active region in the three different layers of the dielectric layer 111 in the L-axis direction and T-axis direction cross-sections obtained above.

The average number of cores 1111a per unit area (1 μm×1 μm) of the dielectric layer 111 is 25 to 35. For example, the average number of cores 1111a per unit area (1 μm×1 μm) of the dielectric layer 111 may be 27 to 35. If the average number of cores 1111a per unit area (1 μm×1 μm) of the dielectric layer 111 is less than 25 or more than 35, the dielectric constant of the capacitor may decrease.

Figure 5:
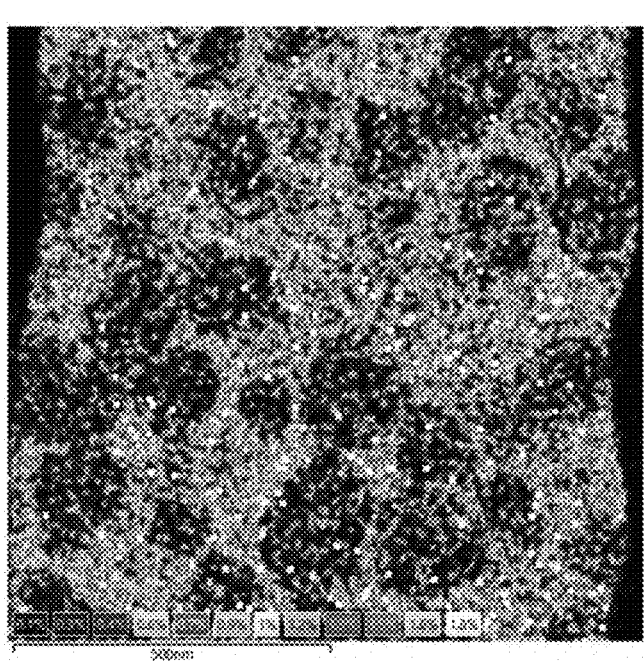
FIG. 5 is an image of TEM mapping based on a secondary component Dy, as a component analysis result within the unit area (1 μm×1 μm) of the dielectric layer for the capacitor in Example 3.
Figure 6:
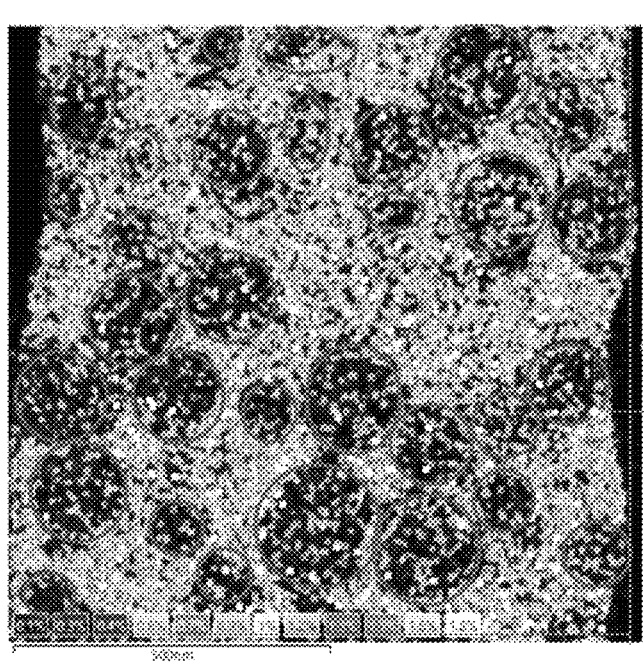
FIG. 6 is an image showing a core in FIG. 5.

FIG. 5 is an image of TEM mapping based on a secondary component Dy, as a component analysis result within the unit area (1 μm×1 μm) of the dielectric layer 111 for the multilayered capacitor according to an embodiment (Example 3), and FIG. 6 is an image showing the core 1111a in FIG. 5. Referring to FIG. 6, the number of portions of the core 1111a with an average diameter of about 50 nm or more within a unit area (1 μm×1 μm) of the dielectric layer 111 may be measured.

The average diameter of the dielectric grains 1111 having a core-shell structure may be 100 nm to 1000 nm, and the average diameter of one core 1111a included in the dielectric grains 1111 having a core-shell structure may be 50 nm to 500 nm.

For example, the dielectric layer 111 may have an average thickness of 0.15 μm or more, 0.3 μm or more, 0.5 μm or more, 1.0 μm or more, or 2.0 μm or more, and may be 10 μm or less, 8.0 μm or less, or 5.0 μm or less.

The average thickness of the dielectric layer 111 may be measured by the following method.

First, a scanning electron microscope image obtained by observing a cross-sectional sample with a scanning electron microscope (SEM) is prepared.

In the SEM image of the cross-sectional sample, the arithmetic mean value of the dielectric layer 111 thickness at 10 points spaced at a predetermined interval from the reference point, which is the central point in the L-axis direction or W-axis direction of the dielectric layer 111, may be considered as the average thickness of the dielectric layer 111.

The intervals of the 10 points may be adjusted depending on the scale of the SEM image, and may be, for example, 1 μm to 100 μm, 1 μm to 50 μm, or 1 μm to 10 μm.

At this time, all 10 points must be located in the dielectric layer 111, and if all 10 points are not located in the dielectric layer 111, the position of the reference point may be changed, or the interval between the 10 points may be adjusted.

The first internal electrode 121 and the second internal electrode 122 are electrodes having different polarities, which are alternately disposed opposite each other along the T-axis direction with the dielectric layer 111 interposed therebetween, and one end of the first internal electrode 121 and the second internal electrode 122 may be exposed through the third and fourth surfaces of the capacitor body 110, respectively.

The first internal electrode 121 and the second internal electrode 122 may be electrically insulated from each other by the dielectric layer 111 disposed therebetween.

The ends of the first internal electrode 121 and the second internal electrode 122, which are alternately exposed through the third and fourth surfaces of the capacitor body 110, may be electrically connected with the first external electrode 131 and the second external electrode 132, respectively.

The first internal electrode 121 and the second internal electrode 122 may include a conductive metal, for example, a metal such as Ni, Cu, Ag, Pd, Au, or an alloy thereof, such as an Ag—Pd alloy.

Additionally, the first internal electrode 121 and the second internal electrode 122 may include dielectric particles having the same composition as the ceramic material included in the dielectric layer 111.

The first internal electrode 121 and the second internal electrode 122 may be formed using a conductive paste including a conductive metal. The printing method of the conductive paste may be a screen-printing method or a gravure printing method.

For example, the average thickness of the first internal electrode 121 and the second internal electrode 122 may be 0.1 μm to 2 μm.

In the SEM image, the average thickness of the first internal electrode 121 and the second internal electrode 122 may be an arithmetic mean value of the thickness of the first internal electrode 121 or the second internal electrode 122 at 10 points spaced at predetermined intervals from the reference point, which is the center point in the length direction (L-axis direction) or width direction (W-axis direction) of the first internal electrode 121 or the second internal electrode 122. The intervals of the 10 points may be adjusted depending on the scale of the SEM image, and may be, for example, be 1 μm to 100 μm, 1 μm to 50 μm, or 1 μm to 10 μm. At this time, all 10 points must be positioned within the first internal electrode 121 or the second internal electrode 122, and if all 10 points are not located within the first internal electrode 121 or the second internal electrode 122, the position of the reference point may be changed, or the interval between the 10 points may be adjusted.

The first external electrode 131 and the second external electrode 132 are provided with voltages of different polarities and may be electrically connected with exposed portions of the first inner electrode 121 and the second inner electrode 122, respectively.

According to the above configuration, when a predetermined voltage is applied to the first external electrode 131 and the second external electrode 132, charges are accumulated between the opposing first internal electrode 121 and the second internal electrode 122. At this time, the capacitance of the multilayered ceramic capacitor 100 is proportional to the overlapped area of the first internal electrode 121 and the second internal electrode 122, which overlap each other along the T-axis direction in the active portion A.

The first external electrode 131 and the second external electrode 132 may each include first and second connection portions respectively disposed on the third and fourth surfaces of the capacitor body 110 to connect with the first inner electrode 121 and the second inner electrode 122, respectively, and first and second band portions disposed at the corners where the third and fourth surfaces or the fifth and sixth surfaces of the capacitor body 110 meet.

The first and second band portions may extend from the first and second connection portions to parts of the first and second surfaces or the fifth and sixth surfaces of the capacitor body 110, respectively. The first and second band portions may serve to improve the adhesion strength of the first external electrode 131 and the second external electrode 132.

For example, the first external electrode 131 and the second external electrode 132 may each include a sintered metal layer in contact with the capacitor body 110, a conductive resin layer disposed to cover the sintered metal layer, and a plating layer disposed to cover the conductive resin layer.

The sintered metal layer may include a conductive metal and glass.

For example, the sintered metal layer may include a conductive metal such as at least one selected from the group consisting of copper (Cu), nickel (Ni), silver (Ag), palladium (Pd), gold (Au), platinum (Pt), tin (Sn), tungsten (W), titanium (Ti), lead (Pb), an alloy thereof, and combinations thereof. For example, copper (Cu) may include a copper (Cu) alloy. When the conductive metal includes copper, metals other than copper may be included in an amount of 5 parts by mole or less based on 100 parts by mole of copper.

For example, the sintered metal layer may include a composition of mixed oxides such as glass, for example, one or more selected from the group consisting of a silicon oxide, a boron oxide, an aluminum oxide, a transition metal oxide, an alkali metal oxide, and an alkaline earth metal oxide. The transition metal may include at least one selected from the group consisting of zinc (Zn), titanium (Ti), copper (Cu), vanadium (V), manganese (Mn), iron (Fe), nickel (Ni), and combination thereof. The alkali metal may include at least one selected from the group consisting of lithium (Li), sodium (Na), potassium (K), combinations thereof. The alkaline earth metal may include one or more selected from the group consisting of magnesium (Mg), calcium (Ca), strontium (Sr), barium (Ba), and combinations thereof.

Optionally, the conductive resin layer is formed on the sintered metal layer, and for example, may be formed to completely cover the sintered metal layer. Meanwhile, the first external electrode 131 and the second external electrode 132 may not include a sintered metal layer. In this case, the conductive resin layer may be in direct contact with the capacitor body 110.

The conductive resin layer extends to the first and second surfaces or the fifth and sixth surfaces of the capacitor body 110, and the length of the region (i.e., band portion) where the conductive resin layer is extended and disposed to the first and second surfaces or the fifth and sixth surfaces of the capacitor body 110 may be longer than the length of the region (i.e., band portion) where the sintered metal layer is extended and disposed to the first and second surfaces or the fifth and sixth surfaces of the capacitor body 110. In other words, the conductive resin layer may be formed on the sintered metal layer and may be formed to completely cover the sintered metal layer.

The conductive resin layer may include a resin and a conductive metal.

The resin included in the conductive resin layer may be implemented by a material which has adhesive properties and shock absorption properties and is able to form a paste when mixed with the conductive metal powder, but is not limited thereto. For example, the resin may include a phenolic resin, an acrylic resin, a silicone resin, an epoxy resin, or a polyimide resin.

The conductive metal included in the conductive resin layer may serve to electrically connect the first internal electrode 121 and the second internal electrode 122 or the sintered metal layer.

The conductive metal included in the conductive resin layer may have a spherical shape, a flake shape, or a combination thereof. That is, the conductive metal may be formed only in flake form, only in spherical form, or in a mixed form of a flake form and a spherical form.

Here, the spherical shape may also include a shape that is not a perfect spherical shape, for example, a shape in which the length ratio of the major axis and the minor axis (major axis/minor axis) is 1.45 or less. Flake shape powder refers to a powder with a flat and elongated shape, and is not particularly limited. But for example, the length ratio of the major axis and the minor axis (major axis/minor axis) may be 1.95 or more.

The first external electrode 131 and the second external electrode 132 may further include a plating layer disposed outside the conductive resin layer.

The plating layer may include at least one selected from the group consisting of nickel (Ni), copper (Cu), tin (Sn), palladium (Pd), platinum (Pt), gold (Au), silver (Ag), tungsten (W), titanium (Ti), and lead (Pb), either alone or in an alloy thereof. For example, the plating layer may include a nickel (Ni) plating layer or a tin (Sn) plating layer, may be in a form in which the nickel (Ni) plating layer and the tin (Sn) plating layer are sequentially stacked, or may be in a form in which the tin (Sn) plating layer, the nickel (Ni) plating layer, and the tin (Sn) plating layer are sequentially stacked. Additionally, the plating layer may include a plurality of nickel (Ni) plating layers and/or a plurality of tin (Sn) plating layers.

The plating layer may improve mountability to the substrate, structural reliability, durability to the outside, heat resistance, and equivalent series resistance (ESR) of the multilayered capacitor 100.

A method of preparing a multilayered capacitor includes: preparing dielectric powder; preparing a capacitor body including a dielectric layer and an internal electrode; and forming an external electrode on the outside of the capacitor body.

First, a method for preparing dielectric powder will be described.

While wet-mixing the barium (Ba) precursor and the titanium (Ti) precursor, and adding an additional barium (Ba) precursor or a titanium (Ti) precursor, the mole ratio of barium to titanium (Ba/Ti mole ratio) is 0.9975 to 1.0055. Through this, it is possible to prepare barium titanate powder with a uniform mole ratio of barium to titanium, and by using this to form a dielectric layer, it is possible to improve reliability characteristics by forming dielectric grains with a uniform mole ratio of barium to titanium.

The barium (Ba) precursor may include $BaO_2$, $BaTiO_3$, $BaCO_3$, BaO, or a combination thereof.

The titanium (Ti) precursor may be an oxide, salt, or alkoxide of titanium, for example, titanium dioxide ($TiO_2$), titanium diisopropoxide diacetyl acetonate (TPA), titanium alkoxide, or a combination thereof.

At this time, if the dielectric powder further contains additional elements such as Ca, Sr, Sn, or Zr, precursors of these additional elements may be further added along with the barium (Ba) precursor and the titanium (Ti) precursor. For example, precursors of additional elements may be compounds such as oxides or carbonates containing these additional elements.

Wet-mixing may be conducted, for example, by using a disperser such as a bead mill or ball mill, or by wet dispersing the solvent with a high-pressure dispersion treatment. For example, when dispersing using a bead mill, beads with a diameter of 0.03 mm to 0.1 mm may be used to disperse at a peripheral speed of 5 m/s to 15 m/s in 5 passes to 30 passes.

Solvents used for wet-mixing may include, for example, aqueous solvents such as ion-exchanged water, pure water, ultrapure water, or distilled water, or amine-based solvents such as alcohol-based solvents, ammonia, or organic amines, in combination with water.

Optionally, a dispersant may be further added in the raw material mixing step, and the dispersant may include, for example, a polyvinyl butyral-based dispersant, a polyvinyl acetal-based dispersant, a polycarboxylic acid-based dispersant, a maleic acid-based dispersant, a polyethylene glycol-based dispersant, an allyl ether copolymer-based dispersant, and the like.

Optionally, the raw material mixture may be dried and dry-milled.

Next, the raw material mixture is calcinated to prepare a dielectric powder.

Calcination may be conducted at 800° C. to 1000° C. for 1 hour to 8 hours, or at 840° C. to 900° C. for 2 hours to 6 hours.

Calcination may be conducted in a vacuum atmosphere or atmospheric pressure atmosphere, for example, in an atmospheric pressure of 10,000 Pa to 1,000,000 Pa. The vacuum atmosphere may be, for example, a vacuum atmosphere of 20,000 Pa or less, or 100 Pa or less.

If the calcination temperature is less than 800° C. or the calcination time is less than 1 hour, non-reaction and dispersion may be an issue. If the calcination temperature is more than 1000° C. or the calcination time is less than 1 hour, coarse powder may be synthesized.

Optionally, the dielectric powder may be wet-milled, then dried and dry-milled.

Next, manufacturing of the capacitor body will be described.

In the manufacturing process of the capacitor body, a dielectric paste that becomes a dielectric layer after firing and a conductive paste that becomes an inner electrode after firing are prepared.

In some embodiments, the dielectric paste is manufactured in the following method. The prepared dielectric powder is uniformly mixed by means such as wet-mixing, dried, and then heat-treated under predetermined conditions to obtain calcined powder. An organic vehicle or an aqueous vehicle is added to the obtained calcined powder and kneaded to prepare a dielectric paste.

A dielectric green sheet is obtained by forming the obtained dielectric paste into a sheet using a technique such as the doctor blade method. Additionally, the dielectric paste may contain additives selected from various dispersants, plasticizers, dielectrics, secondary component compounds, or glass, if necessary.

The conductive paste for internal electrodes is prepared by mixing a conductive powder made of conductive metal or an alloy thereof with a binder or solvent. The conductive paste for internal electrodes may, if necessary, contain ceramic powder (for example, barium titanate powder) as a co-material. The co-material may act to suppress sintering of the conductive powder during the firing process.

The conductive paste for internal electrodes is applied to the surface of the dielectric green sheet in a predetermined pattern using various printing methods such as screen-printing or transfer methods. Then, a dielectric green sheet laminate structure is prepared by stacking a plurality of layers of dielectric green sheets on which internal electrode patterns are formed, and then pressing the plurality of layers of dielectric green sheets in the stacking direction. At this time, the dielectric green sheet and the internal electrode pattern may be stacked so that the dielectric green sheet is positioned on the upper and lower surfaces of the dielectric green sheet laminate structure in the stacking direction.

Optionally, the obtained dielectric green sheet laminate structure may be cut to a predetermined size by dicing or the like.

Additionally, the dielectric green sheet laminate structure may be solidified and dried to remove plasticizers, etc., if necessary, and after solidified and dried, the dielectric green sheet laminate structure may be barrel polished using a horizontal centrifugal barrel machine, and the like. In barrel polishing, the dielectric green sheet laminate structure is placed into a barrel container with media and polishing liquid, and rotational motion or vibration is applied to the barrel container, thus unnecessary parts, such as burrs generated during cutting, may be polished. Additionally, after barrel polishing, the dielectric green sheet laminate structure may be washed with a cleaning solution such as water, and dried.

The capacitor body is obtained after binder removal treatment and firing of the dielectric green sheet laminate structure.

The conditions for binder removal may be appropriately adjusted depending on the primary components of the dielectric layer or the internal electrode layer. For example, the rate of temperature rise during binder removal treatment may be 5° C./hour to 300° C./hour, the support temperature may be 180° C. to 400° C., and the temperature holding time may be 0.5 hours to 24 hours. The treatment atmosphere of the binder removal may be the air or a reducing atmosphere.

The conditions for the firing may be appropriately adjusted depending on the primary components of the dielectric layer or the internal electrode layer. For example, the temperature during firing may be 1200° C. to 1350° C., or 1220° C. to 1300° C., and the time may be 0.5 hours to 8 hours, or 1 hour to 3 hours. The firing atmosphere may be a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, the oxygen partial pressure in the firing atmosphere may be $1.0 \times 10^{-14}$ MPa to $1.0 \times 10^{-10}$ MPa.

After the firing, annealing may be performed as needed. Annealing is a treatment to reoxidize the dielectric layer, and annealing may be performed if firing is performed in a reducing atmosphere. The conditions of the annealing treatment may also be appropriately adjusted depending on the primary component composition of the dielectric layer. For example, the annealing temperature may be 950° C. to 1150° C., the time may be 0 to 20 hours, and the rate of temperature rise may be 50° C./hour to 500° C./hour. The annealing atmosphere may be a humidified nitrogen gas ($N_2$) atmosphere, and the oxygen partial pressure may be $1.0 \times 10^{-9}$ MPa to $1.0 \times 10^{-5}$ MPa.

In the binder removal treatment, sintering treatment, or the annealing treatment, for example, a wetter may be used to humidify nitrogen gas or mixed gas. In this case, the water temperature may be 5° C. to 75° C. The binder removal treatment, firing treatment, and annealing treatment may be performed sequentially or independently.

Optionally, surface treatment such as sand blasting, laser irradiation, barrel polishing, etc. may be performed on the third and fourth surfaces of the obtained capacitor body. By performing this surface treatment, the ends of the first internal electrode and the second internal electrode may be exposed to the outermost surfaces of the third and fourth surfaces, and thus the electrical connection between the first external electrode and the second external electrode, and the first internal electrode and the second internal electrode, may be improved, so that alloy portions may be easily formed.

A paste for forming a sintered metal layer may be applied using an external electrode on the outer surface of the obtained capacitor body, and then sintered to form a sintered metal layer.

The paste for forming the sintered metal layer may include a conductive metal and glass. Since the description of the conductive metal and glass is the same as described above, repetitive description will be omitted. In addition, the paste for forming the sintered metal layer may optionally include secondary components such as a binder, solvent, dispersant, plasticizer, or oxide powder. The binder may be, for example, ethylcellulose, acrylic, butyral, etc., and the solvent may be, for example, an organic solvent or aqueous solvent such as terpineol, butylcarbitol, alcohol, methyl ethyl ketone, acetone, toluene, and the like.

Methods for applying the paste for forming the sintered metal layer on the outer surface of the capacitor body may include various printing methods such as a dip method and screen-printing, an application method using a dispenser, etc., and a spraying method using a spray. The paste for forming the sintered metal layer may be applied to at least the third and fourth surfaces of the capacitor body, and optionally applied to a part of the first, second, fifth, or sixth surfaces on which the band portions of the first and second external electrodes are formed.

Thereafter, the capacitor body onto which the paste for forming the sintered metal layer is applied is dried and sintered at a temperature of 700° C. to 1000° C. for 0.1 to 3 hours to form the sintered metal layer.

Optionally, a paste for forming a conductive resin layer may be applied to the outer surface of the obtained capacitor body and then cured to form a conductive resin layer.

The paste for forming the conductive resin layer may include a resin and, optionally, a conductive metal or a non-conductive filler. Since the description of the conductive metal and resin is the same as described above, repetitive description will be omitted. Additionally, the paste for forming the conductive resin layer may optionally include secondary components such as a binder, solvent, dispersant, plasticizer, or oxide powder. The binder may be, for example, ethylcellulose, acrylic, butyral, etc., and the solvent may be an organic solvent or aqueous solvent such as terpineol, butylcarbitol, alcohol, methyl ethyl ketone, acetone, and toluene.

For example, the conductive resin layer may be formed by dipping the capacitor body 110 in a paste for forming the conductive resin layer and then curing it, or by printing the paste for forming the conductive resin layer on the surface of the capacitor body 110 by a screen-printing method or a gravure printing method, or by applying the paste for forming the conductive resin layer to the surface of the capacitor body 110 and then curing it.

Next, a plating layer is formed on the outside of the conductive resin layer.

For example, the plating layer may be formed by a plating method, sputtering, or electrolytic plating (electric deposition).

Hereinafter, detailed embodiments of the present disclosure will be described. However, the embodiments described below are only intended to specifically illustrate or explain the present disclosure, and the range of the present disclosure should not be limited thereto.

PREPARATION EXAMPLE

Preparation Example 1: Preparation of Dielectric Powder

Prepare $BaCO_3$ powder as a barium (Ba) precursor and $TiO_2$ powder as a titanium (Ti) precursor, and weighed and prepared powders with the content ratio as shown in Table 1 below. Weighed $BaCO_3$ powder and $TiO_2$ powder were placed in a beaker, and water is added thereto and wet-mixed with a mixer. At this time, while adjusting the ratio of barium (Ba) and titanium (Ti), barium (Ba) precursor and titanium (Ti) precursor were additionally added and dispersed using a bead mill to prepare a raw material mixture.

The prepared raw material mixture was dried and the agglomerated raw material mixture was dry-milled.

Dielectric powder was prepared by calcination of the raw material mixture at 950° C., under atmospheric pressure for 3 hours.

After calcination, the agglomerated dielectric powder was wet-milled, dried, and the agglomerated raw material mixture was dry-milled to obtain dielectric powder.

TABLE 1

| Category | Barium titanate powder Ba/Ti mole ratio |
|---|---|
| Comparative Example 1 | $0.9970 \pm 0.0003$ |
| Example 1 | $0.9980 \pm 0.0003$ |
| Example 2 | $0.9990 \pm 0.0003$ |
| Example 3 | $1.0000 \pm 0.0003$ |
| Example 4 | $1.0010 \pm 0.0003$ |
| Example 5 | $1.0020 \pm 0.0003$ |
| Example 6 | $1.0030 \pm 0.0003$ |
| Example 7 | $1.0040 \pm 0.0003$ |
| Example 8 | $1.0050 \pm 0.0003$ |
| Comparative Example 2 | $1.0060 \pm 0.0003$ |

Preparation Example 2: Preparation of Multilayered Capacitor

The barium titanate powder prepared in Preparation Example 1 was used as the main ingredient of the dielectric base material, and the composition shown in Table 2 below was used as the secondary component.

The primary component powder and secondary component powder of the dielectric base material were used with zirconium balls ($ZrO_2$ balls) as a dispersion medium, mixed with ethanol/toluene, dispersant, and binder, and then mechanically milled to prepare a dielectric slurry.

The prepared dielectric slurry was used to prepare the dielectric green sheet using the on-roll molding coater.

A conductive paste layer containing nickel (Ni) was printed on the surface of the dielectric green sheet, and the dielectric green sheet (width×length×height=3.2 mm×2.5 mm×2.5 mm) with the conductive paste layer formed was stacked and pressed to prepare a dielectric green sheet laminate structure.

The dielectric green sheet laminate structure was fired under conditions of 400° C. or lower, in a nitrogen atmosphere through a plasticizing process, and at a sintering temperature of 1300° C. or lower, with a hydrogen concentration of 1.0% $H_2$ or less, to manufacture the multilayered capacitors according to the examples and comparative examples.

TABLE 2

| BaTiO$_3$ | | Dy$_2$O$_3$ | MnO$_2$ | V$_2$O$_5$ | BaCO$_3$ | SiO$_2$ | Al$_2$O$_3$ |
|---|---|---|---|---|---|---|---|
| Comparative Example 1 | 1 | 0.1 | 0.1 | 1.5 + 0.9 | 0.75 | 0.5 |
| Example 1 | 1 | 0.1 | 0.1 | 1.5 + 0.8 | 0.75 | 0.5 |
| Example 2 | 1 | 0.1 | 0.1 | 1.5 + 0.7 | 0.75 | 0.5 |
| Example 3 | 1 | 0.1 | 0.1 | 1.5 + 0.6 | 0.75 | 0.5 |
| Example 4 | 1 | 0.1 | 0.1 | 1.5 + 0.5 | 0.75 | 0.5 |
| Example 5 | 1 | 0.1 | 0.1 | 1.5 + 0.4 | 0.75 | 0.5 |
| Example 6 | 1 | 0.1 | 0.1 | 1.5 + 0.3 | 0.75 | 0.5 |
| Example 7 | 1 | 0.1 | 0.1 | 1.5 + 0.2 | 0.75 | 0.5 |
| Example 8 | 1 | 0.1 | 0.1 | 1.5 + 0.1 | 0.75 | 0.5 |
| Comparative Example 2 | 1 | 0.1 | 0.1 | 1.5 | 0.75 | 0.5 |

EXPERIMENTAL EXAMPLES

Experimental Example 1

The mole ratios of barium (Ba) and titanium (Ti) in the core of dielectric grains in the multilayered capacitors manufactured in examples and comparative examples were measured, and the results are shown in Tables 3 and 4.

10 each of the multilayered capacitors manufactured in the examples and comparative examples were prepared, the multilayered capacitor was placed in an epoxy mixture and cured, the sides of the capacitor body 110 in the L-axis direction and the T-axis direction were polished up to ½ the point in the W-axis direction, then fixed, and held in a vacuum atmosphere chamber, so that a cross-sectional sample of the capacitor body 110 is obtained.

A cross-sectional sample of the obtained capacitor body 110 was analyzed by nano-synchrotron X-ray fluorescence (Nano-SXRF) using the European Synchrotron Radiation Facility (ESRF) product ID16A-NI (UPBL04).

At this time, the mole ratio of barium (Ba) and titanium (Ti) in the core of the dielectric grain was measured three times repeatedly by irradiation with Synchrotron X-ray (10 keV or higher) and the average value is calculated.

Figure 7:
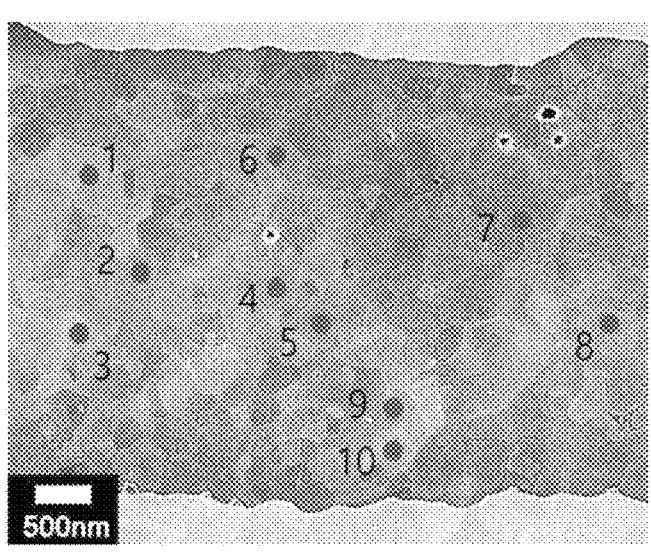
FIG. 7 is a scanning electron microscope (SEM) image obtained by observing dielectric grains of the dielectric layer included in the capacitor of Example 3, using the SEM.

Additionally, the average value of the minimum and maximum values measured from 10 different dielectric grains located in the same dielectric layer was taken as the final mole ratio of barium (Ba) and titanium (Ti). For example, FIG. 7 is a scanning electron microscope (SEM) image obtained by observing dielectric grains of the dielectric layer included in the capacitor of Example 3, using the SEM. As shown in FIG. 7, at least 10 different dielectric grains located in the same dielectric layer may be selected.

The mole ratios of barium (Ba) and titanium (Ti) at 10 points selected in FIG. 7 are shown in Table 3.

In addition, the minimum value Min., maximum value Max., and average value Avg. of the mole ratio of barium (Ba) and titanium (Ti) at the center of the dielectric grain measured in examples and comparative examples are shown in Table 4.

TABLE 3

| Category | Ba/Ti mole ratio at dielectric grain center |
|---|---|
| Point 1 | 0.9997 |
| Point 2 | 0.9998 |
| Point 3 | 1.0001 |
| Point 4 | 0.9999 |
| Point 5 | 1.0002 |
| Point 6 | 1.0003 |
| Point 7 | 1.0001 |
| Point 8 | 1.0003 |
| Point 9 | 0.9997 |
| Point 10 | 1.0003 |

Referring to Table 3, it can be seen that the mole ratio of barium to titanium (Ba/Ti mole ratio) in the barium titanate powder of Table 1 used in Example 3 is similar to the mole ratio at the dielectric grain center, and the error range is within ±0.0003.

TABLE 4

| | Ba/Ti mole ratio (Avg.) | Ba/Ti mole ratio (Min.) | Ba/Ti mole ratio (Max.) |
|---|---|---|---|
| Comparative Example 1 | 0.9970 | 0.9967 | 0.9972 |
| Example 1 | 0.9980 | 0.9979 | 0.9983 |
| Example 2 | 0.9990 | 0.9988 | 0.9992 |
| Example 3 | 1.0000 | 0.9998 | 1.0003 |
| Example 4 | 1.0010 | 1.0008 | 1.0012 |
| Example 5 | 1.0020 | 1.0017 | 1.0023 |
| Example 6 | 1.0030 | 1.0029 | 1.0031 |
| Example 7 | 1.0040 | 1.0038 | 1.0042 |
| Example 8 | 1.0050 | 1.0047 | 1.0053 |
| Comparative Example 2 | 1.0060 | 1.0058 | 1.0061 |

Referring to Table 4, it can be seen that the multilayered capacitor manufactured in the Example has a mole ratio of barium to titanium (Ba/Ti mole ratio) of 0.9975 to 1.0055 at the center of the dielectric grain.

Experimental Example 2

The average area ratio of the shell included in the dielectric grain having a core-shell structure of the multilayered capacitors manufactured in the examples and comparative examples was measured, and the results are shown in Table 5.

10 each of the multilayered capacitors manufactured in the examples and comparative examples are prepared, the L-axis direction and the T-axis direction surfaces (the fifth or sixth surface) of the capacitor body 110 are polished in the W-axis direction until the dielectric layer 111 is exposed, for example, to about ½ of the point, the cross-sections in the L-axis direction and the T-axis direction are exposed, a random dielectric layer 111 is selected from the cross-sections in the L-axis direction and the T-axis direction, and the region of 1 μm×1 μm size (unit area) in the active region is taken as the measurement target.

For the measurement target, TEM image analysis and EDS mapping component analysis are performed under the condition of an accelerating voltage of 80 kV using Cs corrected scanning transmission electron microscope (Cs STEM) equipment, a type of transmission electron microscope.

Figure 8:
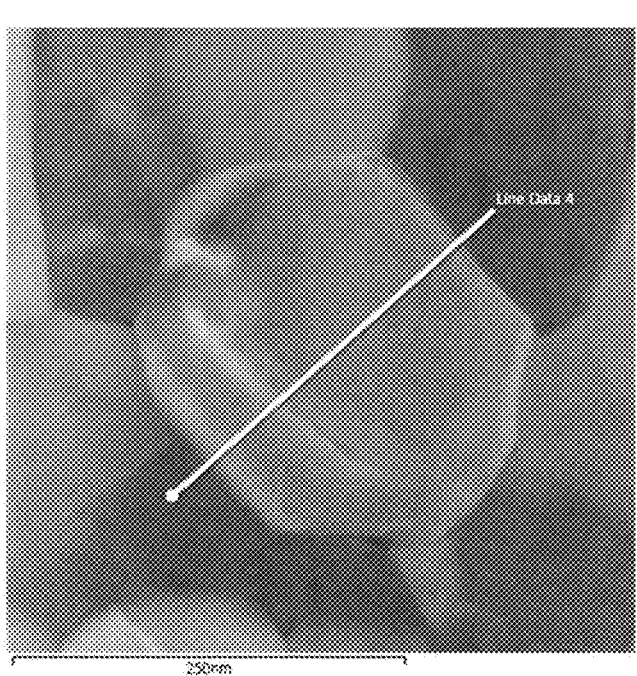
FIG. 8 shows a TEM image analysis result of the capacitor of Example 3.

For example, FIG. 8 shows a TEM image analysis result of the capacitor of Example 3, and FIG. 5 is an image of TEM mapping based on a secondary component Dy, within the unit area (1 μm×1 μm) of the dielectric layer 111 for the capacitor in Example 3.

The area of the dielectric grain shell 1111b was measured through the TEM image analysis, and the shell area ratio range and average shell area ratio of the three values measured in three different dielectric layers are shown in Table 5 below.

Through the above TEM mapping analysis, the number of portions of the core 1111a having an average diameter of about 50 nm or more within a unit area (1 μm×1 μm) of the dielectric layer 111 was measured and is shown in Table 5 below.

Further, the dielectric constant of the multilayered capacitors manufactured in examples and comparative examples was measured, and the results are shown in Table 5.

50 each of the multilayered capacitors manufactured in examples and comparative examples were prepared, and measured under the conditions of 1 kHz, 1 V using the E4980A product of Keysight Technologies as LCR meter equipment. The dielectric constant of the MLCC chip was calculated from the dielectric thickness, internal electrode area, and number of layers and is shown in Table 5 below.

TABLE 5

| Category | Shell area ratio range | Shell average area ratio | Number of cores per unit area of dielectric layer | Dielectric constant |
|---|---|---|---|---|
| Comparative Example 1 | 42.9%-58.5% | 52.0% ± 5.7 | 23/μm² | 1654 |
| Example 1 | 42.1%-50.3% | 45.4% ± 3.4 | 27/μm² | 2265 |
| Example 2 | 38.1%-48.1% | 43.8% ± 4.0 | 28/μm² | 2285 |
| Example 3 | 35.1%-42.9% | 43.6% ± 6.6 | 29/μm² | 2298 |
| Example 4 | 37.7%-45.6% | 42.4% ± 5.7 | 31/μm² | 2264 |
| Example 5 | 32.1%-43.8% | 41.4% ± 6.6 | 31/μm² | 2278 |
| Example 6 | 33.3%-48.2% | 40.8% ± 5.8 | 33/μm² | 2301 |
| Example 7 | 35.3%-48.2% | 39.6% ± 5.0 | 34/μm² | 2264 |
| Example 8 | 35.2%-49.0% | 39.2% ± 6.2 | 35/μm² | 2236 |
| Comparative Example 2 | 32.9%-40.5% | 34.0% ± 5.6 | 37/μm² | 1864 |

Referring to Table 5, in Examples 1 to 8, the average area ratio of the shell is 35% to 50%, and the number of cores per unit area of the dielectric layer is 27 to 35. Thus, it can be seen that the dielectric constant of the capacitor is implemented as 2000 or more.

Experimental Example 3

The breakdown voltage (BDV) of the multilayered capacitors manufactured in examples and comparative examples was evaluated, and the results are shown in Table 6.

50 each of the multilayered capacitors manufactured in the examples and comparative examples are prepared, voltage is applied in a sweep method from 0 V to 1100 V in increments of 1.00000 V using a Keithley meter 2410 model, and the voltage value at the moment when the current value becomes 20 mA is measured as the BDV value. The BDV is measured in a silicone oil bath.

Further, the high-temperature stress reliability and moisture resistance reliability of the multilayered capacitor manufactured in the examples were evaluated, and the results are shown in Table 7.

40 each of the multilayered capacitors manufactured in examples and comparative examples were prepared and mounted on a measurement substrate, and the high-temperature stress reliability was measured by HALT (highly accelerated life test) at 150° C., 150 hours, 100 V using ESPEC (PV-222, HALT) equipment. Moisture resistance reliability was measured using ESPEC (PR-3J, 8585) equipment at 85° C., relative humidity (R.H.) 85%, 32 V, 24 hours.

TABLE 6

| Category | Dielectric constant | Dielectric dissipation factor (DF, %) | BDV average | BDV minimum value | BDV dispersion (CV, standard deviation/ average) |
|---|---|---|---|---|---|
| Comparative Example 1 | 654 | 0.920 | 405 | 357 | 0.11 |
| Example 1 | 265 | 0.910 | 420 | 380 | 0.13 |
| Example 2 | 285 | 0.900 | 418 | 385 | 0.12 |
| Example 3 | 298 | 0.920 | 420 | 377 | 0.11 |
| Example 4 | 264 | 0.910 | 435 | 368 | 0.11 |
| Example 5 | 278 | 0.920 | 415 | 370 | 0.13 |
| Example 6 | 301 | 0.910 | 418 | 382 | 0.12 |
| Example 7 | 264 | 0.920 | 398 | 371 | 0.11 |
| Example 8 | 236 | 0.910 | 395 | 368 | 0.13 |
| Comparative Example 2 | 864 | 0.920 | 416 | 373 | 0.11 |

TABLE 7

| Category | HALT Mean time between failures (h) | 8585 failure time (h) |
|---|---|---|
| Comparative Example 1 | 52 | No short |
| Example 1 | 55 | No short |
| Example 2 | 53 | No short |
| Example 3 | 54 | No short |
| Example 4 | 55 | No short |
| Example 5 | 51 | No short |
| Example 6 | 55 | No short |
| Example 7 | 52 | No short |
| Example 8 | 51 | No short |
| Comparative Example 2 | 50 | No short |

Referring to Tables 6 and 7, it can be seen that the examples had a dielectric constant of 2000 or more and had similar dielectric dissipation factor and BDV values to the comparative examples.

In addition, it can be seen that the examples have similar reliability in a highly accelerated life test (HALT) and moisture resistance reliability to the comparative examples.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: Multilayered capacitor
110: Capacitor body
111: Dielectric layer
1111: Dielectric grain with core-shell structure
1111a: Core of dielectric grain
1111b: Shell of dielectric grain
112, 113: Cover region
121: First internal electrode
122: Second internal electrode
131: First external electrode
132: Second external electrode

What is claimed is:

1. A multilayered capacitor, comprising:
a capacitor body including a dielectric layer and an internal electrode; and
an external electrode disposed outside the capacitor body,
wherein the dielectric layer includes a plurality of dielectric grains containing barium titanate as a primary component,
at least one of the plurality of dielectric grains has a core-shell structure including a core and a shell,
an average mole ratio of barium to titanium (Ba/Ti mole ratio) in the core of the dielectric grain is 0.9975 to 1.0055,
and an average number of cores per unit area of 1 μm×1 μm in the dielectric layer is 25 to 35.

2. The multilayered capacitor of claim 1, wherein
the average mole ratio of barium to titanium (Ba/Ti mole ratio) in the core of the dielectric grain is 0.9980 to 1.0050.

3. The multilayered capacitor of claim 1, wherein
a ratio of the average area of the shell included in one dielectric grain having the core-shell structure to an average area of one dielectric grain having the core-shell structure is 30% to 50%.

4. The multilayered capacitor of claim 3, wherein
the ratio of the average area of the shell included in one dielectric grain having a core-shell structure to the average area of one dielectric grain having the core-shell structure is 38% to 46%.

5. The multilayered capacitor of claim 1, wherein
the primary component comprises at least one selected from the group consisting of $BaTiO_3$, $Ba(Ti, Zr)O_3$, $Ba(Ti, Sn)O_3$, $(Ba, Ca)TiO_3$, $(Ba, Ca) (Ti, Zr)O_3$, $(Ba, Ca) (Ti, Sn)O_3$, $(Ba, Sr)TiO_3$, $(Ba, Sr) (Ti, Zr)O_3$, $(Ba, Sr) (Ti, Sn) O_3$, and combinations thereof.

6. The multilayered capacitor of claim 1, wherein
the dielectric grain further comprises a secondary component, and
the secondary component comprises at least one selected from the group consisting of dysprosium (Dy), manganese (Mn), vanadium (V), silicon (Si), aluminum (Al), and combinations thereof.

7. The multilayered capacitor of claim 6, wherein:
the secondary component further comprises at least one selected from the group consisting of magnesium (Mg), tin (Sn), antimony (Sb), germanium (Ge), gallium (Ga), indium (In), lanthanum (La), chromium (Cr), hafnium (Hf), Yttrium (Y), actinium (Ac), cerium (Ce), praseodymium (Pr), neodymium (Nd), promethium (Pm), samarium (Sm), europium (Eu), gadolinium (Gd), terbium (Tb), holmium (Ho), erbium (Er), thulium (Tm), ytterbium (Yb), lutetium (Lu), and combinations thereof.

8. The multilayered capacitor of claim 6, wherein
the dielectric grain comprises 0.5 to 1.5 parts by mole of $Dy_2O_3$, 0.05 to 0.15 parts by mole of $MnO_2$, 0.05 to 0.15 parts by mole of $V_2O_5$, 1.0 to 2.5 parts by mole of $BaCO_3$, 0.5 to 1.0 parts by mole of $SiO_2$, or 0.2 to 1.0 parts by mole of $Al_2O_3$ as secondary components, with respect to 100 parts by mole of the primary component.

9. The multilayered capacitor of claim 6, wherein
the shell comprises the secondary component in excess of 0.1 moles to 30.0 moles or less with respect to 100 moles of the primary component and
the core comprises 0.1 moles or less of the secondary component with respect to 100 moles of the primary component.

10. The multilayered capacitor of claim 1, wherein
the core has an average diameter of 50 nm to 500 nm.

11. The multilayered capacitor of claim 1, wherein
the dielectric layer has an average thickness of 0.15 μm to 10 μm.

12. A multilayered capacitor, comprising:
a capacitor body including a dielectric layer and an internal electrode; and
an external electrode disposed outside the capacitor body,
wherein the dielectric layer includes a plurality of dielectric grains containing barium titanate as a primary component,
at least one of the plurality of dielectric grains has a core-shell structure including a core and a shell,
an average mole ratio of barium to titanium (Ba/Ti mole ratio) in the core of the dielectric grain is 0.9975 to 1.0055,
an average number of the cores per unit area of 1 μm×1 μm in the dielectric layer is 27 to 35,
a ratio of an average area of the shell included in one dielectric grain having a core-shell structure to an average area of one dielectric grain having the core-shell structure is 30% to 50%.

13. The multilayered capacitor of claim 12, wherein
the average mole ratio of barium to titanium (Ba/Ti mole ratio) in the core of the dielectric grain is 0.9980 to 1.0050.

14. The multilayered capacitor of claim 12, wherein
the ratio of the average area of the shell included in one dielectric grain having a core-shell structure to the average area of one dielectric grain having the core-shell structure is 38% to 46%.

15. The multilayered capacitor of claim 12, wherein
The primary component comprises at least one selected from the group consisting of $BaTiO_3$, $Ba(Ti, Zr)O_3$, $Ba(Ti, Sn)O_3$, $(Ba, Ca)TiO_3$, $(Ba, Ca) (Ti, Zr)O_3$, $(Ba, Ca) (Ti, Sn)O_3$, $(Ba, Sr)TiO_3$, $(Ba, Sr) (Ti, Zr)O_3$, $(Ba, Sr) (Ti, Sn)O_3$, and combinations thereof.

16. The multilayered capacitor of claim 12, wherein
the dielectric grain further comprises a secondary component, and
the secondary component comprises at least one selected from the group consisting of dysprosium (Dy), manganese (Mn), vanadium (V), silicon (Si), aluminum (Al), and combinations thereof.

17. The multilayered capacitor of claim 16, wherein
the dielectric grain comprises 0.5 to 1.5 parts by mole of $Dy_2O_3$, 0.05 to 0.15 parts by mole of $MnO_2$, 0.05 to 0.15 parts by mole of $V_2O_5$, 1.0 to 2.5 parts by mole of $BaCO_3$, 0.5 to 1.0 parts by mole of $SiO_2$, or 0.2 to 1.0 parts by mole of $Al_2O_3$ as the secondary components, with respect to 100 parts by mole of the primary component.

18. The multilayered capacitor of claim 16, wherein the shell comprises the secondary component in excess of 0.1 moles to 30.0 moles or less with respect to 100 moles of the primary component, and the core comprises 0.1 moles or less of the secondary component with respect to 100 moles of the primary component.

19. The multilayered capacitor of claim 12, wherein the core has an average diameter of 50 nm to 500 nm.

20. The multilayered capacitor of claim 12, wherein the dielectric layer has an average thickness of 0.15 μm to 10 μm.

\* \* \* \* \*